UNITED STATES PATENT OFFICE.

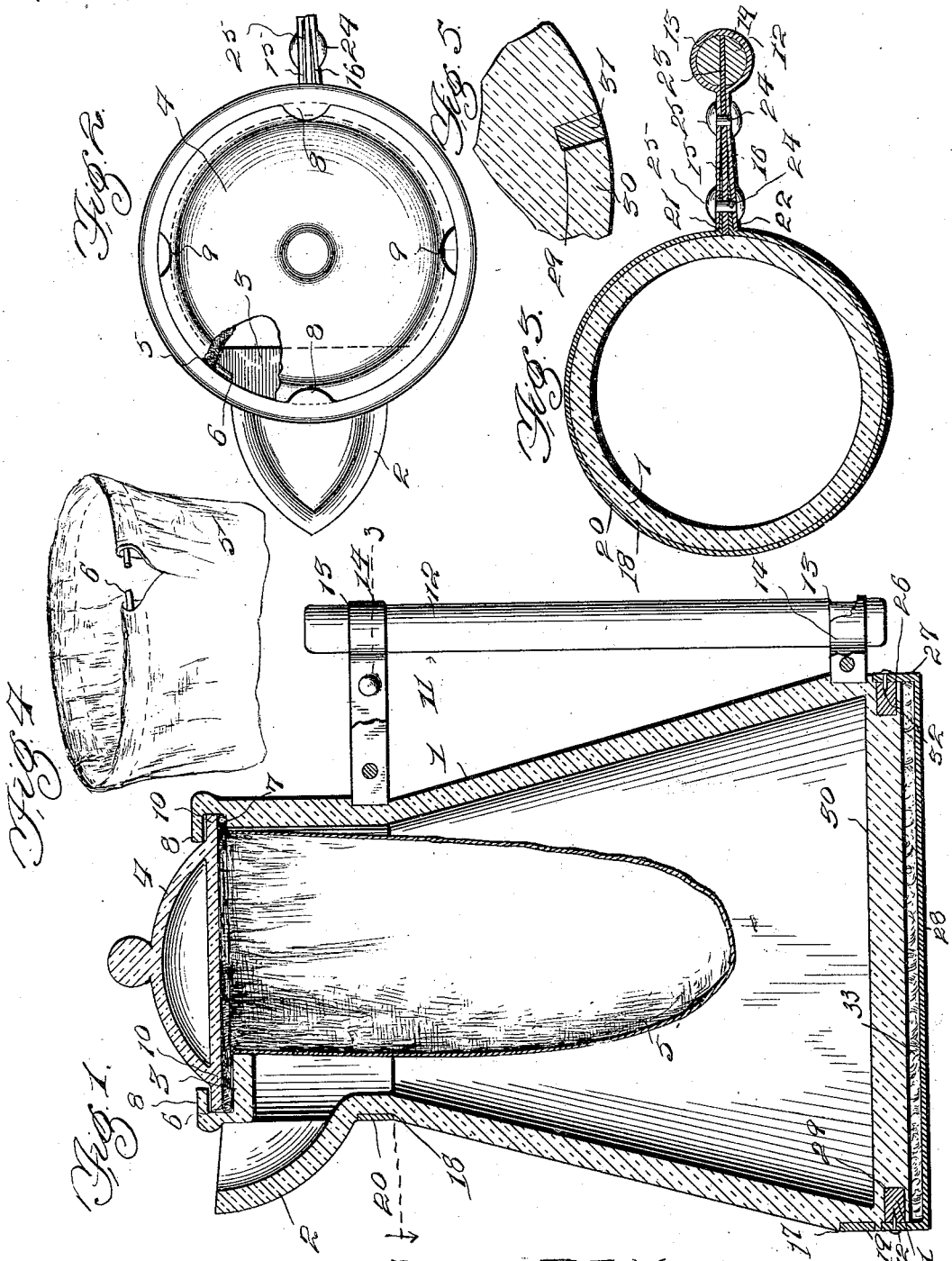

FRANK A. HARRISON, OF KEOKUK, IOWA.

TEA OR COFFEE POT.

SPECIFICATION forming part of Letters Patent No. 703,919, dated July 1, 1902.

Application filed August 2, 1901. Serial No. 70,648. (No model.)

*To all whom it may concern:*

Be it known that I, FRANK A. HARRISON, a citizen of the United States, residing at Keokuk, in the county of Lee and State of Iowa, have invented a new and useful Tea or Coffee Pot, of which the following is a specification.

This invention relates to a utensil adapted to be used either as a tea or a coffee pot, and has for its objects to present a strong, durable, and thoroughly efficient pot in which coffee or tea may be made, the pot to be of earthenware, whereby it shall be absolutely seamless, and thus easy of cleansing, and to be provided with means whereby liquid will not escape from the top of the pot when the same is tilted for pouring out the contents thereof, said means operating also to prevent the drip-bag containing the coffee or the tea from choking the spout.

A further object is to provide a novel form of handle, this to be associated with the body of the pot in such manner as to be thoroughly effective in use, but readily detachable from the pot should the same be broken.

A further object is to provide a novel form of supplemental bottom for the body, this bottom to be made from metal and to be associated with the body in such manner as to permit of its ready detachment when desired.

A further object is to provide a novel form of cushion for the bottom of the pot, the cushion to be made of a refractory substance, thereby to permit of the pot being placed upon a hot stove without damage to the cushion, the cushion serving to shield the bottom of the body from injury either from heat or from liability of being broken by being dropped or heavily seated upon a hard object.

A further object is to provide a novel form of drip-bag-suspending ring or bail, the ring to be of such construction as to permit the bag being readily detached therefrom when the same is to be cleansed or to be replaced by a new one.

With these and other objects in view, as will appear as the nature of the invention is better understood, the same consists of the novel construction and combination of parts of a coffee or tea pot, as will be hereinafter fully described and claimed.

In the accompanying drawings, forming a part of this specification, and in which like numerals of reference indicate corresponding parts, there is illustrated a form of embodiment of the invention capable of carrying the same into effect, it being understood that the elements herein exhibited may be varied or changed as to shape, proportion, and exact manner of assemblage without departing from the scope of the invention, and in these drawings—

Figure 1 is a view in sectional elevation of a utensil embodying the improvements hereinafter to be described. Fig. 2 is a view in plan of the top of the utensil, a portion of the lid being broken away to exhibit the spout-guard. Fig. 3 is a view in horizontal sectoin, taken on the line 3 3, Fig. 1. Fig. 4 is a perspective detail view of a portion of the drip-bag, showing the manner in which the ring thereof is associated with the bag. Fig. 5 is a fragmentary detail view in plan, showing more particularly the manner in which the plugs that are engaged by the holding means for assembling the supplemental bottom with the body are positioned within the bottom of the utensil.

Referring to the drawings, 1 designates the body of the utensil, which is to be made of any suitable earthenware—such as porcelain, stone-china, or the like—and in any preferred shape, the form herein shown being merely illustrative of one style that may be employed. The neck portion of the body is provided with a spout 2 of any usual or preferred construction, and back of the mouth and extending transversely across the neck portion from side to side is a spout-guard 3, the same being provided to prevent the contents of the utensil from escaping around the lid 4 when the utensil is tilted for the purpose of discharging its contents. In addition to this function the guard also operates to prevent the drip-bag 5 from choking the spout under the same conditions. The drip-bag 5 is to be made of any suitable textile fabric suited for the purpose and is associated with and supported in position within the utensil by a divided ring 6, the ends of which are normally separated, as shown in Fig. 4, thereby to permit of ready detachment of the bag therefrom when the same is to be cleansed or is to be replaced by a new one. When the ring is positioned within the utensil for supporting the bag, it rests at its side and rear end upon a circumferential flange 7 and at its front portion upon the spout-guard 3, and as the guard projects inward some distance beyond the wall of the neck it will be seen that the bag will be held away from the sides of the utensil, as clearly shown in Fig. 1, so that free discharge of the liquid contained within the utensil may be effected. To hold the lid 4 against dropping from the utensil when the same is tilted, the mouth of the utensil is provided with two oppositely-disposed inward-projecting lugs 8, and the lid is provided with two oppositely-disposed peripheral recesses 9, so that by placing the lid with the recesses 9 over the lugs 8, so as to permit the rim 10 of the lid to pass under the lugs, and then giving the lid a quarter-turn or more or less it will be positively held against accidental separation from the utensil by the said lugs.

The handle 11, which constitutes one of the important features of this invention, comprises a wooden handhold 12, provided near its upper and lower extremities with a circumferential recess 13, these recesses to be engaged by a clamping-band 14, the terminals 15 and 16 of which are disposed in parallel relation to each other, as shown in Fig. 3. As the manner of associating the handle with the utensil is the same at both points of attachment, a description of one will serve for both. The body of the utensil is provided near its bottom and at its neck with a circumferential recess 17 and 18, respectively, and these recesses are engaged by metallic bands 19 and 20, respectively, the terminals 21 and 22 of the bands being disposed in parallel relation to each other and are housed between the terminals 15 and 16 of the clamping-bands 14, as clearly shown in Fig. 3. To give added rigidity to the handle and to increase the strength of its association with the body of the utensil, a metallic plate 23 is driven or otherwise forced into the handhold at the points where it is encircled by the clamping-bands 14, and these plates extend to and bear against the wall of the circumferential flanges 17 and 18 and lie between the terminals 21 and 23 of the body-bands. To hold the terminals of the handle-clamping bands, the terminals of the body-bands, and the reinforcing-plates 23 rigidly assembled, the said terminals and the plates are each provided with two or more transversely-disposed orifices, which are engaged by bolts 24, carrying nuts 25, and by this arrangement not only is the handle firmly associated with the body, but ready separation of the same therefrom may be readily effected when necessary or desired. In practice it is intended to furnish the utensil-body *per se* as an article of manufacture, so that in the event of the body being broken the handle may be removed therefrom and attached to the new body, thereby saving the expense of the handle.

The lower portion of the bottom of the body is reduced, as at 26, and the reduced portion is engaged by the circumferential flange 27 of a supplemental metallic bottom 28, this bottom by preference being made of a single piece of metal stamped or otherwise formed to the appropriate shape. To effect detachable connection between the supplemental bottom and the body of the utensil, the reduced lower portion of the latter is provided with a plurality of sockets or orifices 29, projecting inward parallel with the plane of the bottom 30, and these sockets have fitted into them penetrable plugs 31, preferably of wood, that when the bottom 28 is in position are engaged by nails or screws 32, thereby holding the parts rigidly assembled. It will be apparent that from the fact that these plugs are entirely housed or covered by the flange 27 it will be impossible for them to work out, so that when the supplemental bottom is once positioned on the body it will become a fixed part thereof. Should it be desired to detach the bottom 28 from the body, it will only be necessary to remove the fastening means above referred to, which may be accomplished in a ready manner.

To shield the bottom 30 of the body from direct contact with the heated surface and also to guard it from injury or breakage, which would result were the bare bottom 30 heavily seated upon a hard object, there is a packing or cushion 33 interposed between the bottom 28 and the bottom 30, the cushion to be of a refractory substance, preferably an asbestos mat, as combining the necessary refractory qualities with a cushioning effect. By this simple arrangement it will be seen that if the utensil be placed over the flame— say of a gas or gasolene burner—no injury can result to the bottom 30.

It will be seen from the foregoing description that the utensil of the present invention combines in a simple and feasible manner all the requisites necessary to the presentation of a thoroughly effective article for the purpose designed, and by reason of the simplicity of its construction it may be manufactured and sold at a nominal figure.

Having thus fully described the invention, what I claim as new, and desire to secure by Letters Patent, is—

1. A utensil of the character specified, having its body portion provided near its top and bottom with a circumferential groove, in combination with bands seated in the grooves and having their terminals arranged parallel with each other, a handhold carrying clamping-bands having their terminals arranged parallel with each other and embracing those of the body-bands, a reinforcing-plate carried by each end of the handhold and disposed between the terminals of the body-bands and the clamping-bands, and fastening means passing through the said terminals and the reinforcing-plates.

2. A utensil of the character specified, having its body portion provided near its top and bottom with a circumferential groove, in combination with body-bands seated in the grooves and having their terminals arranged parallel with each other, a handhold provided near its terminals with circumferential grooves, clamping-bands engaging the grooves and having their terminals parallel with each other and embracing those of the body-band, a reinforcing-plate carried by each end of the handhold and disposed between the terminals of the body-bands and the clamping-bands, and detachable fastening means passed through the said terminals and the reinforcing-plates.

In testimony that I claim the foregoing as my own I have hereto affixed my signature in the presence of two witnesses.

FRANK A. HARRISON.

Witnesses:
F. A. KOECHLING,
J. A. WHETSTONE.